United States Patent
Sheng et al.

(10) Patent No.: US 11,896,902 B1
(45) Date of Patent: *Feb. 13, 2024

(54) EMOTION BASED MUSIC STYLE CHANGE USING DEEP LEARNING

(71) Applicant: Electronic Arts Inc., Redwood City, CA (US)

(72) Inventors: Jie Sheng, Sunnyvale, CA (US); Hulya Duygu Yigit, Urbana, IL (US); Chong Zhao, Spring, TX (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,725

(22) Filed: Mar. 7, 2023

Related U.S. Application Data (63) Continuation of application No. 17/229,600, filed on Apr. 13, 2021, now Pat. No. 11,617,952.

(51) Int. Cl.
*A63F 13/54* (2014.01)
*A63F 13/67* (2014.01)
*A63F 13/40* (2014.01)

(52) U.S. Cl.
CPC .............. *A63F 13/54* (2014.09); *A63F 13/40* (2014.09); *A63F 13/67* (2014.09)

(58) Field of Classification Search
CPC ........... A63F 13/67; A63F 13/40; A63F 13/54
See application file for complete search history.

(56) References Cited

U.S. PATENT DOCUMENTS

| | | |
|---|---|---|
| 6,822,153 B2 | 11/2004 | Comair |
| 8,076,565 B1 | 12/2011 | Bennett |
| 10,068,557 B1 | 9/2018 | Engel |
| 10,204,625 B2 | 2/2019 | Mishra |
| 10,628,714 B2 | 4/2020 | Pradeep |
| 10,657,934 B1 | 5/2020 | Kolen |

(Continued)

OTHER PUBLICATIONS

Brunner, G., et al., "Midi-Vae: Modeling Dynamics and Instrumentation of Music With Applications to Style Transfer." 19th International Society for Music Information Retrieval Conference, Paris, France, 2018; 8 pgs.

(Continued)

*Primary Examiner* — William H McCulloch, Jr.
(74) *Attorney, Agent, or Firm* — McDermott Will & Emery LLP (57) ABSTRACT

Various aspects of the subject technology relate to systems, methods, and machine-readable media for changing music of a video game based on a player's emotion. The method includes receiving indicators of emotion comprising in-game attributes of a player in a video game. The method also includes predicting an emotion of the player based on the indicators of emotion from the video game. The method also includes receiving original music from the video game. The method also includes determining an original tone of the original music. The method also includes determining a transformed tone based at least in part on the emotion of the player that was predicted. The method also includes transforming the original tone of the original music to the transformed tone. The method also includes generating transformed music from the original music based on the transformed tone.

20 Claims, 5 Drawing Sheets

(56) References Cited

U.S. PATENT DOCUMENTS

| | | | |
|---|---|---|---|
| 10,909,459 B2 | 2/2021 | Tsatsin | |
| 10,956,808 B1 | 3/2021 | Bhardwaj | |
| 11,010,601 B2 | 5/2021 | Bathiche | |
| 11,295,721 B2 | 4/2022 | Gururani | |
| 11,344,808 B2 | 5/2022 | Estanislao | |
| 11,617,952 B1 * | 4/2023 | Sheng | A63F 13/40 463/35 |
| 2009/0082104 A1 | 3/2009 | Hegstrom | |
| 2009/0082105 A1 | 3/2009 | Hegstrom | |
| 2009/0165632 A1 | 7/2009 | Rigopulos | |
| 2017/0357896 A1 | 12/2017 | Tsatsin | |
| 2018/0144746 A1 | 5/2018 | Mishra | |
| 2019/0087734 A1 | 3/2019 | De | |
| 2020/0406144 A1 | 12/2020 | Estanislao | |
| 2021/0158790 A1 | 5/2021 | Huang | |
| 2022/0101586 A1 | 3/2022 | Krishnan Gorumkonda | |
| 2022/0139376 A1 | 5/2022 | Buesser | |

OTHER PUBLICATIONS

Malik, I., et al., "Neural Translation of Musical Style." retrieved from arXiv:1708.03535v1 [cs.SD] Aug. 11, 2017; 9 pgs.

\* cited by examiner

EMOTION BASED MUSIC STYLE CHANGE USING DEEP LEARNING

CROSS REFERENCE TO RELATED APPLICATIONS

This present application claims the benefit of priority under 35 U.S.C. 120 as a continuation of U.S. patent application Ser. No. 17/229,600, filed Apr. 13, 2021, now allowed, the disclosure of which is hereby incorporated by reference in its entirety for all purposes.

TECHNICAL FIELD

The present disclosure generally relates to video games, and more particularly to changing music of a video game based on a player's emotions.

BACKGROUND

Video games come in a variety of genres with a variety of soundtracks. Music for each video game enhances the gaming experience for players and makes it more memorable. As a result, many iconic games are closely associated with their music, and the music becomes iconic as well.

BRIEF SUMMARY

The subject disclosure provides for systems and methods for emotion based music style change using deep learning. In an aspect, an emotion detection model is trained to predict a player's emotion. For example, the player's emotion may be based on various player in-game attributes. The in-game attributes may include speed of gameplay, damage taken, number of enemies defeated, whether the player is escaping, etc. The training may be through deep learning. According to an aspect, the predicted player emotion may be input into a music classifier model to change a tone of an original music score to fit the predicted player emotion. For example, the original music score may have an original tone of sad. Based on the received predicted player emotion, the tone of the music may be changed to angry. The music classifier model may include a variational autoencoder.

According to one embodiment of the present disclosure, a computer-implemented method for changing music of a video game based on a player's emotion is provided. The method includes receiving indicators of emotion comprising in-game attributes of a player in a video game. The method also includes predicting an emotion of the player based on the indicators of emotion from the video game. The method also includes receiving original music from the video game. The method also includes determining an original tone of the original music. The method also includes determining a transformed tone based at least in part on the emotion of the player that was predicted. The method also includes transforming the original tone of the original music to the transformed tone. The method also includes generating transformed music from the original music based on the transformed tone.

According to one embodiment of the present disclosure, a system is provided including a processor and a memory comprising instructions stored thereon, which when executed by the processor, causes the processor to perform a method for changing music of a video game based on a player's emotion. The method includes receiving indicators of emotion comprising in-game attributes of a player in a video game. The method also includes predicting an emotion of the player based on the indicators of emotion from the video game. The method also includes receiving original music from the video game. The method also includes determining an original tone of the original music. The method also includes determining a transformed tone based at least in part on the emotion of the player that was predicted. The method also includes transforming the original tone of the original music to the transformed tone. The method also includes generating transformed music from the original music based on the transformed tone.

According to one embodiment of the present disclosure, a non-transitory computer-readable storage medium is provided including instructions (e.g., stored sequences of instructions) that, when executed by a processor, cause the processor to perform a method for changing music of a video game based on a player's emotion. The method includes receiving indicators of emotion comprising in-game attributes of a player in a video game. The method also includes predicting an emotion of the player based on the indicators of emotion from the video game. The method also includes receiving original music from the video game. The method also includes determining an original tone of the original music. The method also includes determining a transformed tone based at least in part on the emotion of the player that was predicted. The method also includes transforming the original tone of the original music to the transformed tone. The method also includes generating transformed music from the original music based on the transformed tone.

According to one embodiment of the present disclosure, a system is provided that includes means for storing instructions, and means for executing the stored instructions that, when executed by the means, cause the means to perform a method for changing music of a video game based on a player's emotion. The method includes receiving indicators of emotion comprising in-game attributes of a player in a video game. The method also includes predicting an emotion of the player based on the indicators of emotion from the video game. The method also includes receiving original music from the video game. The method also includes determining an original tone of the original music. The method also includes determining a transformed tone based at least in part on the emotion of the player that was predicted. The method also includes transforming the original tone of the original music to the transformed tone. The method also includes generating transformed music from the original music based on the transformed tone.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Video games come in a variety of genres with a variety of soundtracks. Music for each video game enhances the gaming experience for players and makes it more memorable. As a result, many iconic games are closely associated with their music, and the music becomes iconic as well.

Conventionally, the music of a video game may be based on fixed moments in gameplay of the video game. For example, the music may be configured to change based on a location of the player, a chapter of gameplay, when encountering an important character (e.g., non-player character (NPC)), etc. The music adds a layer of entertainment to the video game and increases player immersion.

However, because the music is typically composed based on fixed moments in the gameplay, the music does not account for the interactions of the player with the video game, which may indicate an emotional state of the player. For example, the music may be sad in tone, but the player may be in an excited state at the time. Additionally, every player will experience an identical music journey and will be encouraged to have the same emotional change in a game. Because the tone of the music does not quite fit the player's emotion, the player may lose immersion with the video game. If the tone of the music were changed to fit the player's emotion, then the player would experience even more enjoyment and immersion with the video game than before. Therefore, there is a need for changing music of a video game based on a player's emotion to increase player enjoyment and immersion with the video game. This would also allow each player to have a musically unique journey through the game.

The subject disclosure provides for systems and methods for changing music of a video game based on a player's emotion. In an aspect, an emotion detection model is trained to predict a player's emotion. For example, the player's emotion may be based on various player in-game attributes. The in-game attributes may include speed of gameplay, damage taken, number of enemies defeated, whether the player is escaping, etc. The training may be through deep learning. According to an aspect, the predicted player emotion may be input into a music classifier model to change a tone of an original music score to fit the predicted player emotion. For example, the original music score may have an original tone of sad. Based on the received predicted player emotion, the tone of the music may be changed to angry. The music classifier model may include a variational autoencoder.

Benefits of changing music based on player emotions includes providing adaptive and well-targeted in-game musical environments. This also improves game music-action flow by tailoring the music style based on the emotions created by the player's actions in a video game. As a result, the players will feel more immersion and enjoyment with the video game because the music style is tailored to each of the players based on their in-game actions. This also keeps the video game fun and interesting because different players will experience the same video game in a variety of different ways.

The disclosed system addresses a problem in traditional video games tied to computer technology, namely, the technical problem of communicating video game situations to a player. The disclosed system solves this technical problem by providing a solution also rooted in computer technology, namely, by changing music of a video game based on a player's emotion. The disclosed system also improves the functioning of the computer itself because it trains the computer to recognize and extract relevant information from player data in order to customize changing a tone of an original musical score of a video game to fit a player's predicted emotion.

Figure 1:
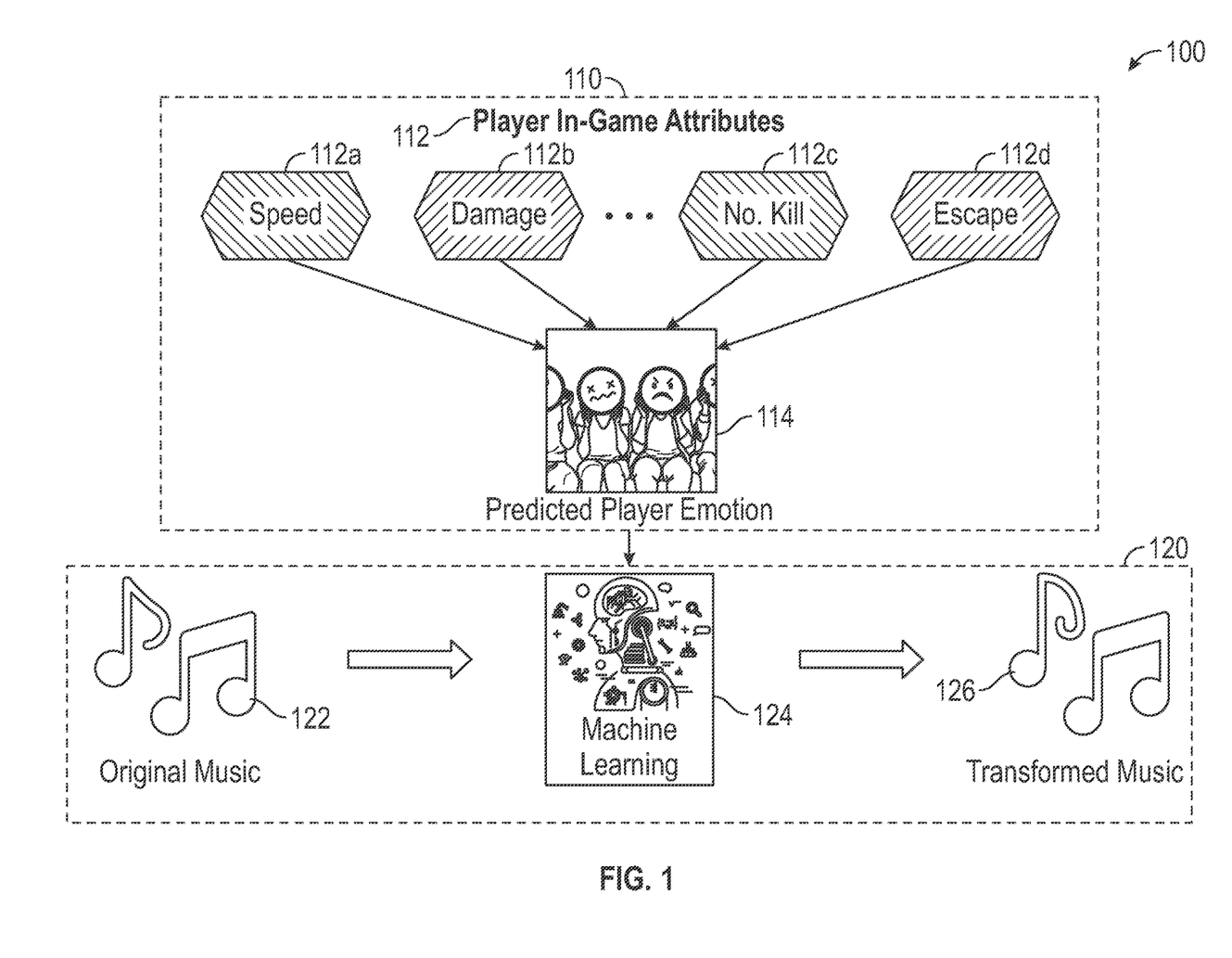
FIG. 1 illustrates an exemplary system for changing music of a video game based on a player's emotion, according to certain aspects of the present disclosure.

FIG. 1 illustrates an exemplary system 100 for changing music of a video game based on a player's emotion, according to certain aspects of the present disclosure. The system may include an emotion detection model 110 and a music transformation model 120. The emotion detection model 110 may be configured to predict a player's emotion based on various player in-game attributes 112. For example, the player in-game attributes 112 may include speed of progress 112*a* (e.g., a rate of in-game progress), damage taken 112*b*, number of enemies defeated 112*c* (e.g., number of kills), whether the player is escaping 112*d*, etc. The player in-game attributes 112 may also include health of an in-game character, how quickly input is arriving from the player (e.g., how quickly buttons are being pressed), in-game achievements, in-game performance of the player as compared to opponents, probability/likelihood of winning a match, number of fouls (e.g., in a sporting game), performance of opponent(s)/rival(s), and the like. It is understood that these are exemplary only, and other in-game attributes may be included without departing from the scope of the disclosure.

The emotion detection model 110 may be trained to predict the player's emotion 114 based on the detected player in-game attributes 112. For example, if the player is progressing slowly through the game (e.g., speed 112*a* is slow), then the emotion detection model 110 may predict that the player's emotion 114 is scared/fearful. If the player has a high number of kills 112*c*, it may be predicted that the player's emotion 114 is motivated/excited. According to aspects, various combinations of the player in-game attributes 112 may be utilized to predict what the player's emotion 114 is. For example, if the player is progressing slowly 112*a*, has taken high damage 112*b*, has a low number of kills 112*c*, is not escaping 112*d*, and/or is pressing game pad buttons slowly, it may be determined that the player's emotion 114 is sad. In this way the player's emotion 114 may be predicted to be happy, sad, angry, scared, excited, etc., based on the detected player in-game attributes 112.

According to aspects, the emotion detection model 110 may be trained on a set of test data. For example, the test data may include information regarding various detected in-game attributes 112 for players for a variety of video games and corresponding emotions for each of the players in each video game. In an implementation, a player's in-game attributes 112 may be tracked over a variety of video games that the player is playing to determine correlations between the player's emotions and a type of video game. For example, it may be determined that the player is generally happy when playing a first-person shooter type game, is generally scared when playing a horror genre game, is generally angry when playing a puzzle game, etc. The emotion detection model 110 may utilize these predetermined correlations to predict the player's emotion 114 more accurately.

According to aspects, the predicted player emotion 114 may be received by a machine learning model 124 of the music transformation model 120 to transform original music 122 to transformed music 126 based on the predicted player emotion 114. For example, the machine learning model 124 may include a variational autoencoder. The machine learning model 124 may be trained through deep learning to transform a tone of the original music 122. For example, the machine learning model 124 may be trained through training data to learn to recognize a tone of music based on a composition of a musical score. Once trained, the machine learning model 124 may utilize the predicted player emotion 114 to transform the music according to the predicted player emotion 114. For example, the original music 122 may be determined to be happy and the predicted player emotion 114 may be sad. The machine learning model 124 may transform the original music 122 into transformed music 126 that sounds sad. In an implementation, the transformed music 126 may be based on the original music 122 such that only a tone of the original music 122 is changed.

According to aspects, the original music 122 of a video game may include an original musical score having an original tone. The original musical score may vary depending on a type/genre of game, an in-game situation, whether certain characters are present, etc. The original tone may also be based on a type/genre of game, an in-game situation, whether certain characters are present, etc. For example, in an adventure game, the tone of the original music 122 may be happy, exciting, etc. Similarly, in a horror game, the tone of the original music 122 may be sad, intense, scary, etc. Accordingly, the machine learning model 124 may transform the original music 122 into the transformed music 126 based on the tone of the original music 122 and the predicted player emotion 114.

According to additional aspects, the system 100 may be configured to transform music based on various in-game factors. For example, when an enemy is approaching (or a monster is approaching), even if the player has not noticed this happening, the music may be transformed to alert the player that something dangerous is about to happen. The system 100 may predict what emotion the player will have and transform the music accordingly so that the player has a more immersive gaming experience.

In an implementation, the music may be transformed to elicit an enhanced emotion based on the predicted emotion 114. For example, in an action game, the music may be transformed to further excite the player when it is predicted that the player is excited. Similarly, in a horror game, the music may be transformed to further scare the player when it is predicted that the player is scared. The music may also be transformed to elicit an opposite emotion in order to help the player. For example, in a horror game, the music may be transformed to be less scary.

Figure 2:
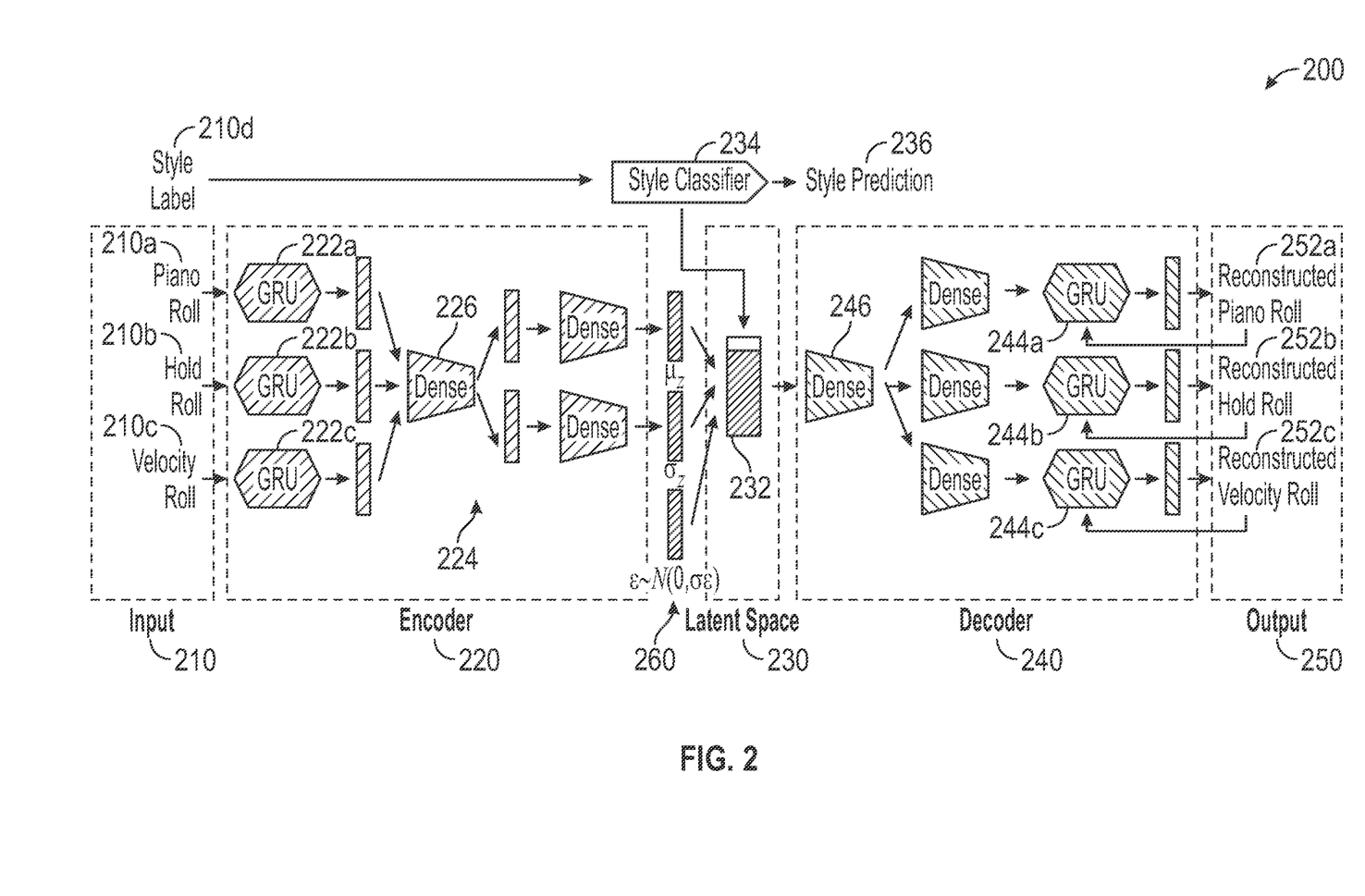
FIG. 2 illustrates an exemplary variational autoencoder for changing music of a video game based on a player's emotion, according to certain aspects of the present disclosure.

FIG. 2 illustrates an exemplary variational autoencoder 200 for changing music of a video game based on a player's emotion, according to certain aspects of the present disclosure. For example, the variational autoencoder 200 may be included in the machine learning model 124 of the emotion detection model 110 of FIG. 1. The variational autoencoder 200 may be trained to compress music into a latent representation 232, and then reconstruct the music based on a predicted emotion of a player (e.g., predicted player emotion 114).

According to aspects, the variational autoencoder 200 may include an encoder 220, latent space 230, and a decoder 240. The encoder 220 may include multiple gated recurrent units 222a, 222b, and 222c (GRUs). Each GRU 222a, 222b, and 222c may be configured to receive input 210 (e.g., media files) including original music of a video game (e.g., original music 122). For example, the input 210 may include a piano roll 210a, a hold roll 210b, and a velocity roll 210c. The input 210 may also include a style label 210d. The piano roll 210a may include information regarding musical notes for the original music, the hold roll 210b may include information regarding how long each note of the piano roll 210a is played for, and the velocity roll 210c may include information regarding how loud each note of the original music is. The style label 210d may include information regarding a musical style of the original music.

According to aspects, the piano roll 210a may be received by a first GRU 220a, the hold roll 210b may be received by a second GRU 220b, and the velocity roll 210c may be received by a third GRU 222c. The style label 210d may be received by a style classifier 234 and utilized for style prediction 236.

According to aspects, the encoder 220 may include a compressor 224 for compressing the input 210 down to a smaller dimensional representation (e.g., a latent representation 232). For example, the compressor 224 may compress dimensions of the input 210 down to latent variables 260 for the latent space 230. The latent representation 232 may include a distributional assumption that facilitates each dimension of the latent space 230 to learn something unique and different about the music that is input. In an implementation, the compressor 224 may include multiple compressor units 226 arranged in series and/or in parallel.

According to aspects, the decoder 240 may decode and reconstruct the music from the latent representation 232. For example, the decoder 240 may include an expander 242 for expanding the latent representation 232 to reconstruct the music based on a predicted emotion 114. The expanded latent representation 232 may be processed by GRUs 244a, 244b, 244c to output 250 a reconstructed piano roll 252a, a reconstructed hold roll 252b, and a reconstructed velocity roll 252c. These outputs 250 may then be utilized to generate a reconstructed musical score (e.g., transformed music 126) based on the predicted emotion of a player 114. In an implementation, the expander 242 may include multiple expander units 246 arranged in series and/or in parallel.

According to aspects, the style classifier 234 may align dimensions of the latent space 230 to specifically to account for a pattern associated with an emotion. For example, patterns for different emotions may be learned during a training phase. According to aspects, the encoder 220 may first compress the data (e.g., input 210) into a smaller space (e.g., the latent space 230) to identify a pattern associated with an emotion. The music may then be reconstructed from the identified pattern to confirm that the pattern was correctly associated with the emotion. In order to change the emotion of the music, the dimensions associated with the style classifier 234 may be swapped and input to the decoder 240 as a new latent representation associated with the emotion. Once expanded, the new latent representation may generate a reconstructed musical score with a different emotion than the original musical score.

According to additional aspects, a predicted emotion may associated with a combination of scale values. For example, happiness may include a combination of the numbers 1, 2, 3, and sadness may include a combination of the numbers 4, 5, 6. In order to transform the music from happy to sad, the scale values of 1, 2, 3 may be switched to be 4, 5, 6. The emotions and/or sentiments of a player may be continuously determined in real-time as the video game is being played. According to aspects, the scale values corresponding to each emotion may have been determined ahead of time during the training phase so that each emotion is associated with a unique set of scale values. Thereafter, changing an emotion of the music may be achieved by swapping the scale values of the emotions.

According to aspects, the music may be transformed continuously through transitions. For example, when transforming original music from happy to sad, the original music may include a transition that gradually transforms the music from happy to less happy to sad to more sad. Additionally, the emotion 114 of the player may be closely tracked (e.g., predicted) in real-time so that the player's emotion 114 may also transition between different extremes of the same emotion. For example, the music may transition from happy, to more happy, to extremely happy based on tracking of the player's emotion 114.

In this way, different players may experience the same video game in a variety of different ways. For example, during a team match, it is possible for three different players on the same team to experience different emotions individually. Each of these players will enjoy a unique gaming experience even though they are all on the same team.

It is understood that the variational autoencoder 200 is exemplary only, and may be configured differently than what is illustrated to achieve similar results. It is further understood that the components of the variational autoencoder 200, including the encoder 220, the latent space 230, and/or the decoder 240 are exemplary only, and may be configured differently than what is illustrated to achieve similar results.

Figure 3:
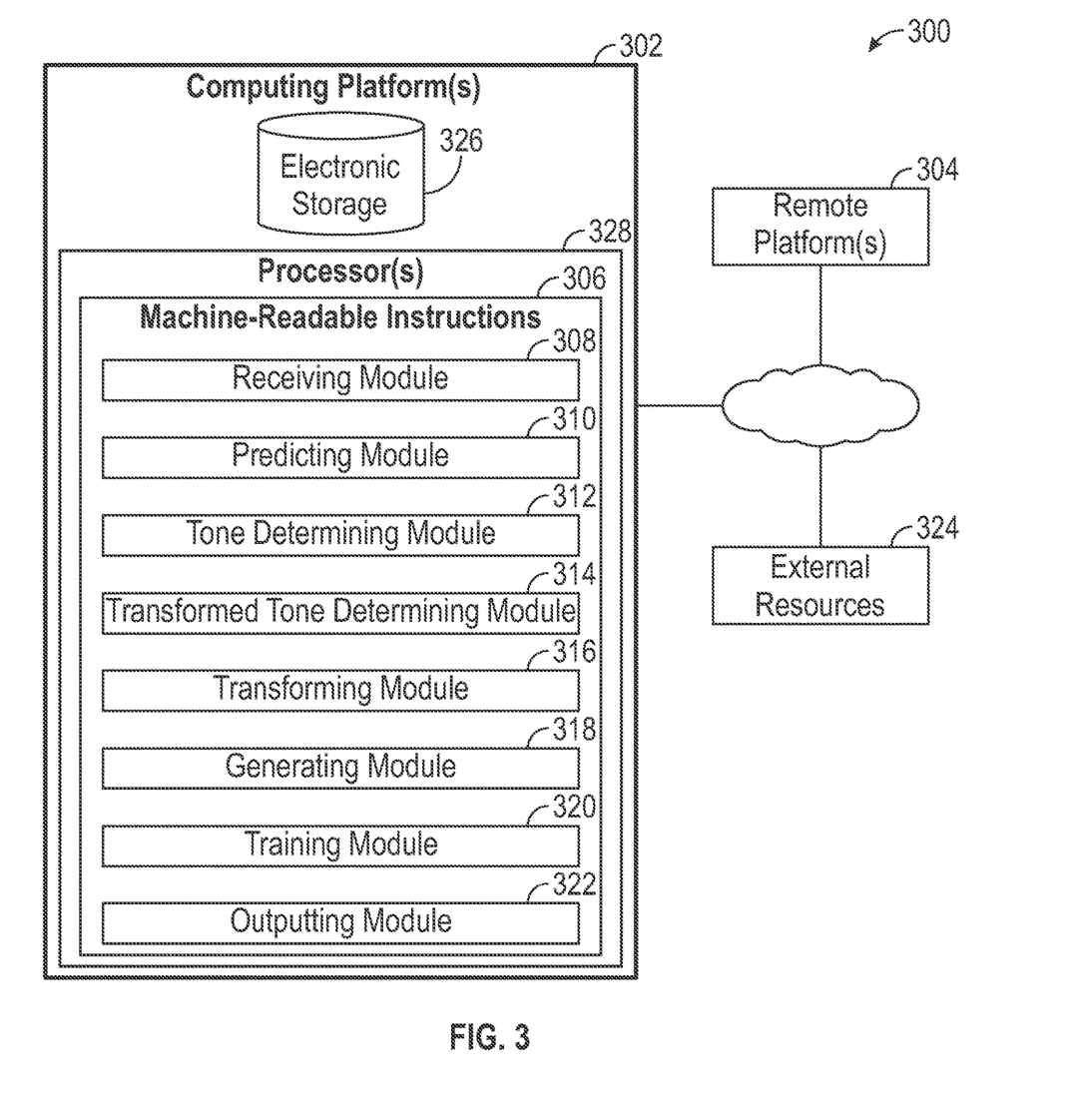
FIG. 3 illustrates a system configured for changing music of a video game based on a player's emotion, in accordance with one or more implementations.

FIG. 3 illustrates a system 300 configured for changing music of a video game based on a player's emotion, in accordance with one or more implementations. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of receiving module 308, predicting module 310, tone determining module 312, transformed tone determining module 314, transforming module 316, generating module 318, training module 320, and/or outputting module 322, and/or other instruction modules.

Receiving module 308 may be configured to receive indicators of an emotion including in-game attributes of a player in a video game. The in-game attributes of the player may include at least one of rate of game progress, damage taken, damage caused, number of kills, and/or a status of game action. The emotion may include at least one of happy, sad, angry, afraid, or motivated. The receiving module 308 may also be configured to receive original music from the video game.

Predicting module 310 may be configured predict an emotion of the player based on the indicators of emotion from the video game.

Tone determining module 312 may be configured to determine an original tone (e.g., original sentiment) of the original music. The original tone may be based on a category of the original music.

Transformed tone determining module 314 may be configured to determine a transformed tone (e.g., transformed sentiment) based at least in part on the emotion of the player that was predicted.

Transforming module 316 may be configured to transform the original tone of the original music to the transformed tone.

Generating module 318 may be configured to generate transformed music from the original music based on the transformed tone.

Training module 320 may be configured to train a training a model (e.g., a machine learning algorithm) to recognize a tone (e.g., sentiment) of music. The model may include a variational autoencoder. Inputs to the model may include at least one of a piano roll, a hold roll, and/or a velocity roll.

Outputting module 322 may be configured to output the transformed music to the video game.

In some implementations, computing platform(s) 302, remote platform(s) 304, and/or external resources 324 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 324 may be operatively linked via some other communication media.

A given remote platform 304 may include one or more processors configured to execute computer program modules. The computer program modules may be configured to enable an expert or user associated with the given remote platform 304 to interface with system 300 and/or external resources 324, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 324 may include sources of information outside of system 300, external entities participating with system 300, and/or other resources. In some implementations, some or all of the functionality attributed herein to external resources 324 may be provided by resources included in system 300.

Computing platform(s) 302 may include electronic storage 326, one or more processors 328, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 326 may comprise non-transitory storage media that electronically stores information. The electronic storage media of electronic storage 326 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 326 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 326 may include one or more virtual storage resources (e.g., cloud storage, a virtual private network, and/or other virtual storage resources). Electronic storage 326 may store software algorithms, information determined by processor(s) 328, information received from computing platform(s) 302, information received from remote platform(s) 304, and/or other information that enables computing platform(s) 302 to function as described herein.

Processor(s) 328 may be configured to provide information processing capabilities in computing platform(s) 302. As such, processor(s) 328 may include one or more of a digital processor, an analog processor, a digital circuit designed to process information, an analog circuit designed to process information, a state machine, and/or other mechanisms for electronically processing information. Although processor(s) 328 is shown in FIG. 3 as a single entity, this is for illustrative purposes only. In some implementations, processor(s) 328 may include a plurality of processing units. These processing units may be physically located within the same device, or processor(s) 328 may represent processing functionality of a plurality of devices operating in coordination. Processor(s) 328 may be configured to execute modules 308, 310, 312, 314, 316, 318, 320, and/or 322, and/or other modules. Processor(s) 328 may be configured to execute modules 308, 310, 312, 314, 316, 318, 320, and/or 322, and/or other modules by software, hardware, firmware, some combination of software, hardware, and/or firmware, and/or other mechanisms for configuring processing capabilities on processor(s) 328. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, and/or 322 are illustrated in FIG. 3 as being implemented within a single processing unit, in implementations in which processor(s) 328 includes multiple processing units, one or more of modules 308, 310, 312, 314, 316, 318, 320, and/or 322 may be implemented remotely from the other modules. The description of the functionality provided by the different modules 308, 310, 312, 314, 316, 318, 320, and/or 322 described below is for illustrative purposes, and is not intended to be limiting, as any of modules 308, 310, 312, 314, 316, 318, 320, and/or 322 may provide more or less functionality than is described. For example, one or more of modules 308, 310, 312, 314, 316, 318, 320, and/or 322 may be eliminated, and some or all of its functionality may be provided by other ones of modules 308, 310, 312, 314, 316, 318, 320, and/or 322. As another example, processor(s) 328 may be configured to execute one or more additional modules that may perform some or all of the functionality attributed below to one of modules 308, 310, 312, 314, 316, 318, 320, and/or 322.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
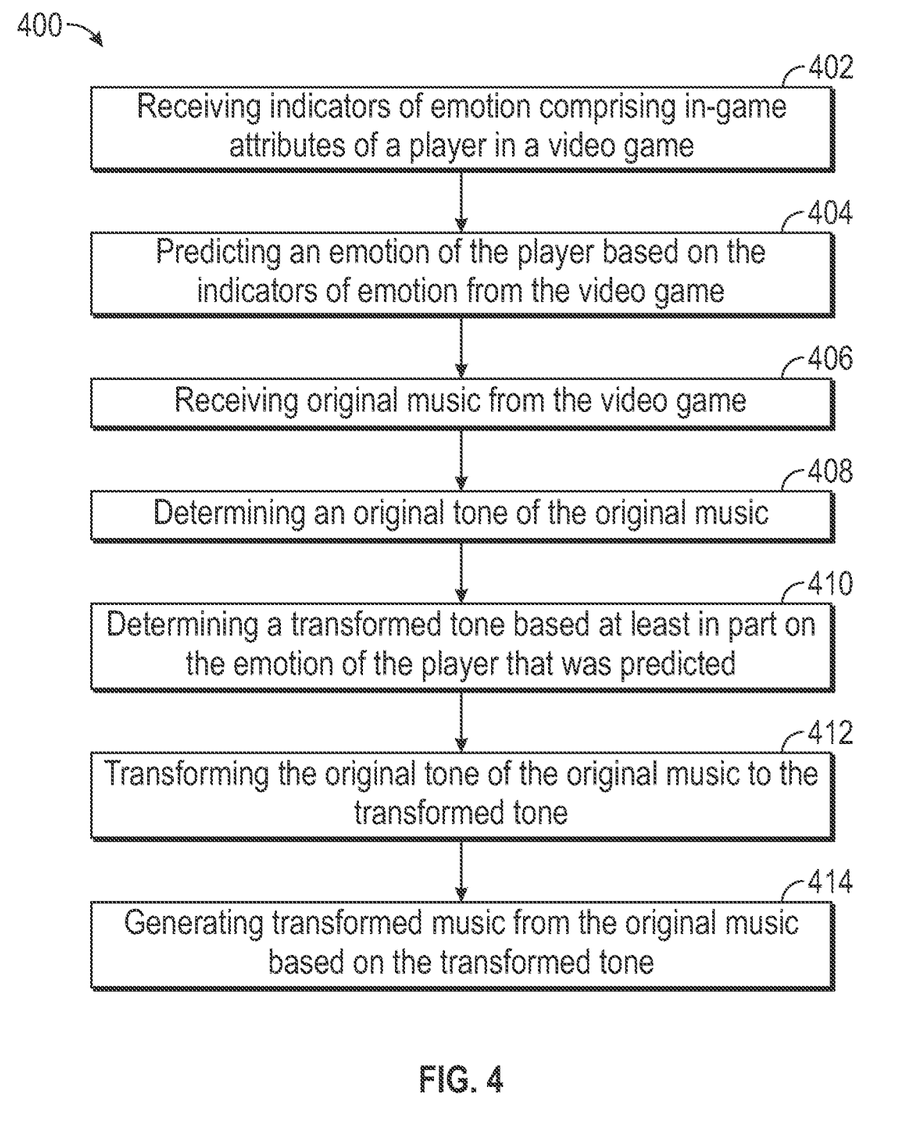
FIG. 4 illustrates an example flow diagram for changing music of a video game based on a player's emotion, according to certain aspects of the present disclosure.

FIG. 4 illustrates an example flow diagram (e.g., process 400) for changing music of a video game based on a player's emotion, according to certain aspects of the disclosure. For explanatory purposes, the example process 400 is described herein with reference to FIGS. 1-3. Further for explanatory purposes, the steps of the example process 400 are described herein as occurring in serial, or linearly. However, multiple instances of the example process 400 may occur in parallel. For purposes of explanation of the subject technology, the process 400 will be discussed in reference to FIGS. 1-3.

At step 402, indicators of emotion are received, including in-game attributes of a player in a video game.

At step 404, an emotion of the player is predicted based on the indicators of emotion from the video game.

At step 406, original music is received from the video game.

At step 408, an original tone of the original music is determined.

At step 410, a transformed tone is determined based at least in part on the emotion of the player that was predicted.

At step 412, the original tone of the original music is transformed to the transformed tone.

At step 414, transformed music is generated from the original music based on the transformed tone.

For example, as described above in relation to FIGS. 1-3, at step 402, indicators of emotion are received (e.g., at emotion detection model 110 of FIG. 1), including in-game attributes (e.g., player in-game attributes 112 of FIG. 1) of a player in a video game. At step 404, an emotion of the player is predicted (e.g., predicted player emotion 114 of FIG. 1) based on the indicators of emotion from the video game (e.g., via predicting module 310). At step 406, original music (e.g., input 210 of FIG. 2) is received from the video game. At step 408, an original tone of the original music is determined (e.g., via style classifier 234 of FIG. 2). At step 410, a transformed tone is determined (e.g., via style prediction 236 of FIG. 2) based at least in part on the emotion of the player that was predicted. At step 412, the original tone of the original music is transformed to the transformed tone (e.g., via transforming module 316 of FIG. 3). At step 414, transformed music (e.g., transformed music 126 of FIG. 1) is generated from the original music (e.g., original music 122 of FIG. 1) based on the transformed tone.

According to an aspect, the in-game attributes of the player may include at least one of rate of game progress, damage taken, damage caused, number of kills, and/or a status of game action.

According to an aspect, the original tone may be based on a category of the original music.

According to an aspect, the process 400 may further include training a model to recognize a tone of music. According to an aspect, the model may include a variational autoencoder. According to an aspect, inputs to the model may include at least one of a piano roll, a hold roll, and/or a velocity roll.

According to an aspect, the process 400 may further include outputting the transformed music to the video game.

According to an aspect, the emotion may include at least one of happy, sad, angry, afraid, or motivated.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Figure 5:
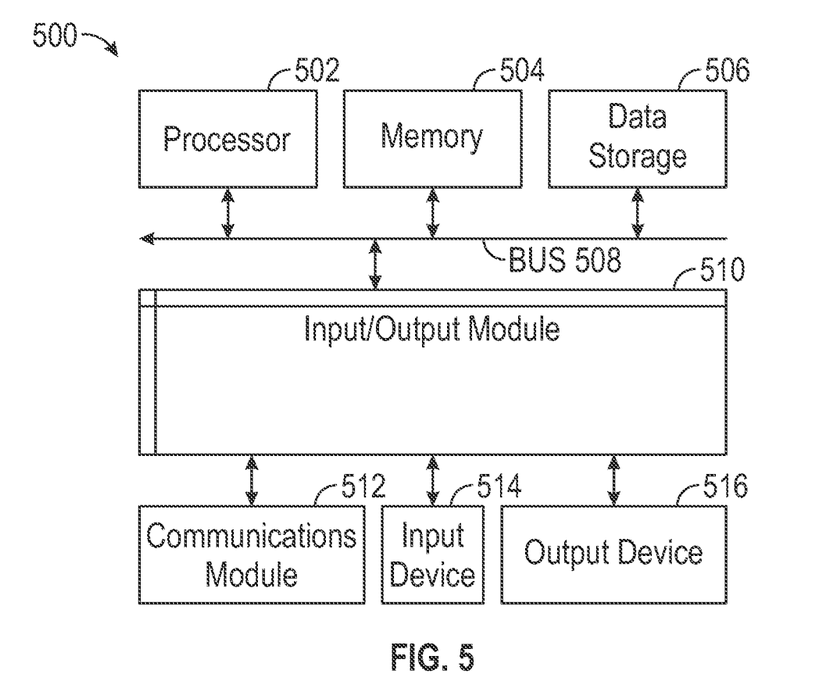
FIG. 5 is a block diagram illustrating an example computer system (e.g., representing both client and server) with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads game data and provides a game, information may be read from the game data and stored in a memory device, such as the memory 504. Additionally, data from the memory 504 servers accessed via a network, the bus 508, or the data storage 506 may be read and loaded into the memory 504. Although data is described as being found in the memory 504, it will be understood that data does not have to be stored in the memory 504 and may be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for changing music of a video game based on a player's emotion, comprising:
   receiving indicators of emotion comprising in-game attributes of a player in a video game;
   receiving original music from the video game;
   determining an original tone of the original music using a model trained to recognize an original tone from the original music; and
   generating transformed music from the original music by a variational autoencoder, wherein the variational autoencoder: compresses the original music into a dimensional representation and reconstructs the dimensional representation based at least in part on the indicators of emotion.

2. The computer-implemented method of claim 1, further comprising predicting an emotion of the player based on the indicators of emotion from the video game.

3. The computer-implemented method of claim 2, wherein inputs to the model comprise at least one of a piano roll, a hold roll, and/or a velocity roll.

4. The computer-implemented method of claim 2, wherein the in-game attributes of the player comprise at least one of rate of game progress, damage taken, damage caused, number of kills, and/or a status of game action.

5. The computer-implemented method of claim 1, wherein the original tone may be based on a category of the original music.

6. The computer-implemented method of claim 1, wherein inputs to the model comprise at least one of a piano roll, a hold roll, and/or a velocity roll.

7. The computer-implemented method of claim 1, further comprising outputting the transformed music to the video game.

8. The computer-implemented method of claim 1, wherein the emotion comprises at least one of happy, sad, angry, afraid, or motivated.

9. A system for changing music of a video game based on a player's emotion, comprising:
   a processor; and
   a memory comprising instructions stored thereon, which when executed by the processor, causes the processor to perform:
   receiving indicators of emotion comprising in-game attributes of a player in a video game;
   receiving original music from the video game;
   determining an original tone of the original music using a model trained to recognize the original tone from the original music; and
   generating transformed music from the original music by a variational autoencoder, wherein the variational autoencoder: compresses the original music into a dimensional representation and reconstructs the dimensional representation based at least in part on the indicators of emotion.

10. The system of claim 9, wherein the in-game attributes of the player comprise at least one of rate of game progress, damage taken, damage caused, number of kills, and/or a status of game action.

11. The system of claim 9, further comprising predicting an emotion of the player based on the indicators of emotion from the video game.

12. The system of claim 11 wherein the memory further comprises instructions stored thereon, which when executed by the processor, causes the processor to determine a transformed tone from the variational autoencoder based at least in part on the emotion of the player that was predicted.

13. The system of claim 9 wherein the memory further comprises instructions stored thereon, which when executed by the processor, causes the processor to transform the original tone of the original music to a transformed tone by the variational autoencoder.

14. The system of claim 9, further comprising stored sequences of instructions, which when executed by the processor, cause the processor to perform:
   training a model to recognize a tone of music.

15. The system of claim 9, further comprising stored sequences of instructions, which when executed by the processor, cause the processor to perform:
   outputting the transformed music to the video game.

16. A non-transitory computer-readable storage medium comprising instructions stored thereon, which when executed by the one or more processors, cause the one or more processors to perform operations for changing music of a video game based on a player's emotion, the operations comprising:
   receiving indicators of emotion comprising in-game attributes of a player in a video game;
   receiving original music from the video game;
   determining an original tone of the original music using a model trained to recognize the original tone from the original music;
   transforming the original tone of the original music to a transformed tone by a variational autoencoder; and
   generating transformed music from the original music based on the transformed tone by the variational autoencoder, wherein the variational autoencoder: compresses the original music into a dimensional representation and reconstructs the dimensional representation based at least in part on the indicators of emotion.

17. The non-transitory computer-readable storage medium of claim 16, wherein the in-game attributes of the player comprise at least one of rate of game progress, damage taken, damage caused, number of kills, and/or a status of game action.

18. The non-transitory computer-readable storage medium of claim 16, wherein the original tone may be based on a category of the original music.

19. The non-transitory computer-readable storage medium of claim 16, further comprising instructions stored thereon, which when executed by one or more processors, cause the one or more processors to perform operations comprising predicting an emotion of the player based on the indicators of emotion from the video game.

20. The non-transitory computer-readable storage medium of claim 19, further comprising determining a transformed tone based at least in part on the emotion of the player that was predicted.

\* \* \* \* \*